United States Patent
Allevåg et al.

(10) Patent No.: US 6,681,562 B2
(45) Date of Patent: Jan. 27, 2004

(54) METHOD OF REDUCING EMISSIONS IN THE EXHAUST GASES OF AN INTERNAL COMBUSTION ENGINE

(75) Inventors: Lars Allevåg, Göteborg (SE); Göran Almkvist, Gråbo (SE); Ingemar Bredström, Göteborg (SE); Karin Thorn, Göteborg (SE)

(73) Assignee: Volvo Car Corporation, Göteborg (SE)

( * ) Notice: Subject to any disclaimer, the term of this patent is extended or adjusted under 35 U.S.C. 154(b) by 0 days.

(21) Appl. No.: 09/683,301

(22) Filed: Dec. 11, 2001

(65) Prior Publication Data

US 2002/0189240 A1 Dec. 19, 2002

Related U.S. Application Data

(63) Continuation of application No. PCT/SE00/01214, filed on Jun. 9, 2000.

(51) Int. Cl.[7] .................................................. F01N 3/00
(52) U.S. Cl. ........................ 60/285; 60/274; 123/90.11; 123/90.15; 123/90.16
(58) Field of Search ............................ 60/274, 285, 284, 60/277; 123/90.11, 90.15, 90.16

(56) References Cited

U.S. PATENT DOCUMENTS

| | | | |
|---|---|---|---|
| 4,722,315 A | * | 2/1988 | Pickel ..................... 123/90.11 |
| 4,756,281 A | | 7/1988 | Chen et al. |
| 5,161,497 A | | 11/1992 | Simko et al. |
| 5,427,078 A | | 6/1995 | Hitomi et al. |
| 5,626,109 A | * | 5/1997 | Yasumura et al. ........ 123/90.15 |
| 5,692,464 A | | 12/1997 | Kimura |
| 5,845,613 A | * | 12/1998 | Yoshikawa ................ 123/90.15 |
| 5,848,529 A | * | 12/1998 | Katoh et al. ................... 60/274 |
| 6,234,123 B1 | * | 5/2001 | Iiyama et al. ............. 123/90.15 |

FOREIGN PATENT DOCUMENTS

| | | |
|---|---|---|
| DE | 4016226 A1 | 11/1991 |
| EP | 0735246 A1 | 10/1996 |
| EP | 0761950 A1 | 3/1997 |
| EP | 0814237 A1 | 12/1997 |

* cited by examiner

*Primary Examiner*—Binh Tran
(74) *Attorney, Agent, or Firm*—Fitch, Even, Tabin & Flannery

(57) ABSTRACT

A method of reducing emissions in the exhaust gases of an internal combustion engine is disclosed. The engine includes at least one cylinder supplied with an air/fuel mixture when a crankshaft of the internal combustion engine rotates, at least one intake valve, at least one exhaust valve, control members for controlling the opening and closing of the intake and exhaust valves, and a piston reciprocating between a top dead-center position and a bottom dead-center position in the cylinder. The method includes supplying an air/fuel mixture with a lambda value greater than 1 to the cylinder, controlling the intake valve so that it opens after the piston has passed the top dead-center position, controlling the exhaust valve so that it opens before the piston has passed the bottom dead-center position, and controlling the exhaust valve so that it closes before the intake valve opens.

12 Claims, 2 Drawing Sheets

METHOD OF REDUCING EMISSIONS IN THE EXHAUST GASES OF AN INTERNAL COMBUSTION ENGINE

CROSS REFERENCE TO RELATED APPLICATIONS

The present application is a continuation of International Application No. PCT/SE0/01/0214, filed Jun. 9, 2000, which claims priority to Swedish Application No. 9902217-0, filed Jun. 11, 1999. Both applications are expressly incorporated herein by reference.

BACKGROUND OF INVENTION

1. Technical Field

The present invention relates to a method of reducing emissions in the exhaust gases from an internal combustion engine. More specifically, the invention relates to a method of reducing exhaust gas emissions that includes supplying an air/fuel mixture to at least one cylinder when the engine crankshaft rotates, and controlling the opening and closing of one or more intake and exhaust valves based on the position of a piston in the cylinder.

2. Background Information

In internal combustion engines, it is desirable to reduce the undesirable emissions present in the exhaust gases of the internal combustion engine in order to reduce pollution of the surrounding environment and to satisfy legal requirements for internal combustion engines. The undesirable emissions present in the exhaust gases include, inter alia, carbon monoxide ("CO"), hydrocarbon compounds ("HC") and nitrous oxides ("$NO_x$").

In order to reduce these exhaust gas emissions, the internal combustion engine is provided with a catalytic converter that completely, or nearly completely burns the emissions by means of a chemical reaction. This chemical reaction occurs only when the catalytic converter has reached a predetermined working temperature, which is reached after a predetermined operating time of the internal combustion engine. During cold-starts of the internal combustion engine, no reduction of the emissions occurs in the catalytic converter.

There are known arrangements for heating the catalytic converter when the internal combustion engine is cold-started. The intent of these arrangements is to rapidly reach a desirable working temperature of the catalytic converter in order to make it possible to reduce the exhaust gas emissions in the internal combustion engine at an early stage. In one such known arrangement, an electric heating element is arranged in the catalytic converter. However, this arrangement makes the catalytic converter complicated and expensive to produce.

Another problem that occurs when internal combustion engines are cold-started is that a comparatively great amount of fuel in relation to the air supplied, or a rich air/fuel mixture, has to be supplied to the internal combustion engine so that the internal combustion engine starts and is capable of working at a substantially constant speed when idling. This rich air/fuel mixture is also supplied so that the internal combustion engine is ready to provide increased torque when the accelerator is operated. By doing so, the drivability of the internal combustion engine is ensured before the internal combustion engine has reached its operating temperature. Without any emission control in the catalytic converter during this cold-start period, the rich air/fuel mixture results in the content of CO, HC and $NO_x$ emitted from the internal combustion engine being high when the engine is cold-started.

Previous attempts have been made to reduce the quantity of fuel in relation to the air supplied, i.e., run the internal combustion engine with a leaner air/fuel mixture when the internal combustion engine is cold-started. However, this results in the internal combustion engine working very unevenly when idling, as well as poor drivability of the internal combustion engine. The speed varies during idle running due to the torque generated by the internal combustion engine being very sensitive to variations in the lambda value of the air/fuel mixture supplied to the cylinder space of the internal combustion engine when the air/fuel mixture is lean. The lambda value, or excess air factor, is the actual air quantity supplied divided by the air quantity theoretically necessary for complete combustion. If the lambda value is greater than 1, the air/fuel mixture is lean. If the lambda value is less than one, the air/fuel mixture is rich.

The fuel supplied from a fuel injection valve can be accurately controlled by the fuel injection system of the internal combustion engine so as to obtain a substantially constant lambda value for the air/fuel mixture supplied. However, when the internal combustion engine is cold, fuel condenses on the comparatively cold walls in the intake duct and cylinder. The fuel condensed on the walls vaporizes during idling and accompanies the air/fuel mixture flowing in the intake duct and being supplied to the cylinder space. If vaporization of the fuel condensed on the walls is uneven, for example, due to pressure variations, temperature gradients, or flow rate of the air/fuel mixture in the intake duct, a variation in the lambda value of the air/fuel mixture supplied to the cylinder space occurs.

As torque generated by the internal combustion engine varies during idling when cold-started, the speed of the internal combustion engine varies. In this regard, the speed of the internal combustion engine refers to the speed of rotation of the crankshaft of the internal combustion engine. When the speed varies, the pressure in the intake duct will also vary. This, in turn, leads to the vaporization of the condensed fuel varying so that a variation of the lambda value of the air/fuel mixture supplied to the cylinder space occurs, resulting in the uneven speed of the internal combustion engine being intensified.

Accordingly, there is a need for controlling the amount of the air/fuel mixture supplied to the internal combustion engine during cold-starts so that the speed of the engine is made more even. Further, there is a need for controlling the internal combustion engine during cold-starts so that exhaust gas emissions are reduced.

SUMMARY OF INVENTION

The internal combustion engine of the present invention includes at least one cylinder to which an air/fuel mixture is supplied when the engine crankshaft rotates, at least one intake valve, at least one exhaust valve, control members for controlling the opening and closing of the intake and exhaust valves, and a piston reciprocating between a top dead-center position and a bottom dead-center position in the cylinder. The one or more exhaust valves are controlled so that they open before the piston passes the bottom dead-center position and close before the intake valve opens.

The present invention provides a method of reducing carbon monoxide ("CO"), hydrocarbon compounds ("HC") and nitrogen oxides ("$NO_x$") in the exhaust gases from an internal combustion engine when cold-started. The invention also makes it possible for an internal combustion engine to run with a lean air/fuel mixture. The method of the present invention further provides a means of reaching the working temperature of the catalytic converter as rapidly as possible.

This is achieved according to the method of the present invention for reducing exhaust gas emissions that includes supplying an air/fuel mixture with a lambda value greater than 1 to the cylinder, and controlling the intake valve so that it opens during the intake stroke after the piston has passed the top dead-center position.

By supplying an air/fuel mixture greater than 1 to the cylinder, the emissions in the exhaust gases emitted from the internal combustion engine are reduced. The internal combustion engine will work at a substantially constant speed during idling by controlling the intake valve so that it opens after the piston has passed the top dead-center position, and by controlling the exhaust valve so that it closes before the intake valve opens. By doing so, exhaust gases are prevented from flowing into the intake duct. This results in even vaporization of the fuel condensed on the walls of the intake duct.

By opening the intake valve after the piston has passed the top dead-center position, powerful swirling or mixing of the air/fuel mixture supplied to the cylinder space is also obtained. By controlling the exhaust valve so that it opens before the piston has passed the bottom dead-center position, the expansion stroke of the piston in the cylinder is interrupted, allowing very hot exhaust gases to flow out through the exhaust duct and on to the catalytic converter, thereby rapidly heating the converter.

BRIEF DESCRIPTION OF DRAWINGS

The invention is described in greater detail below by means of an exemplary embodiment shown in the appended drawings, in which.

DETAILED DESCRIPTION

Figure 1:
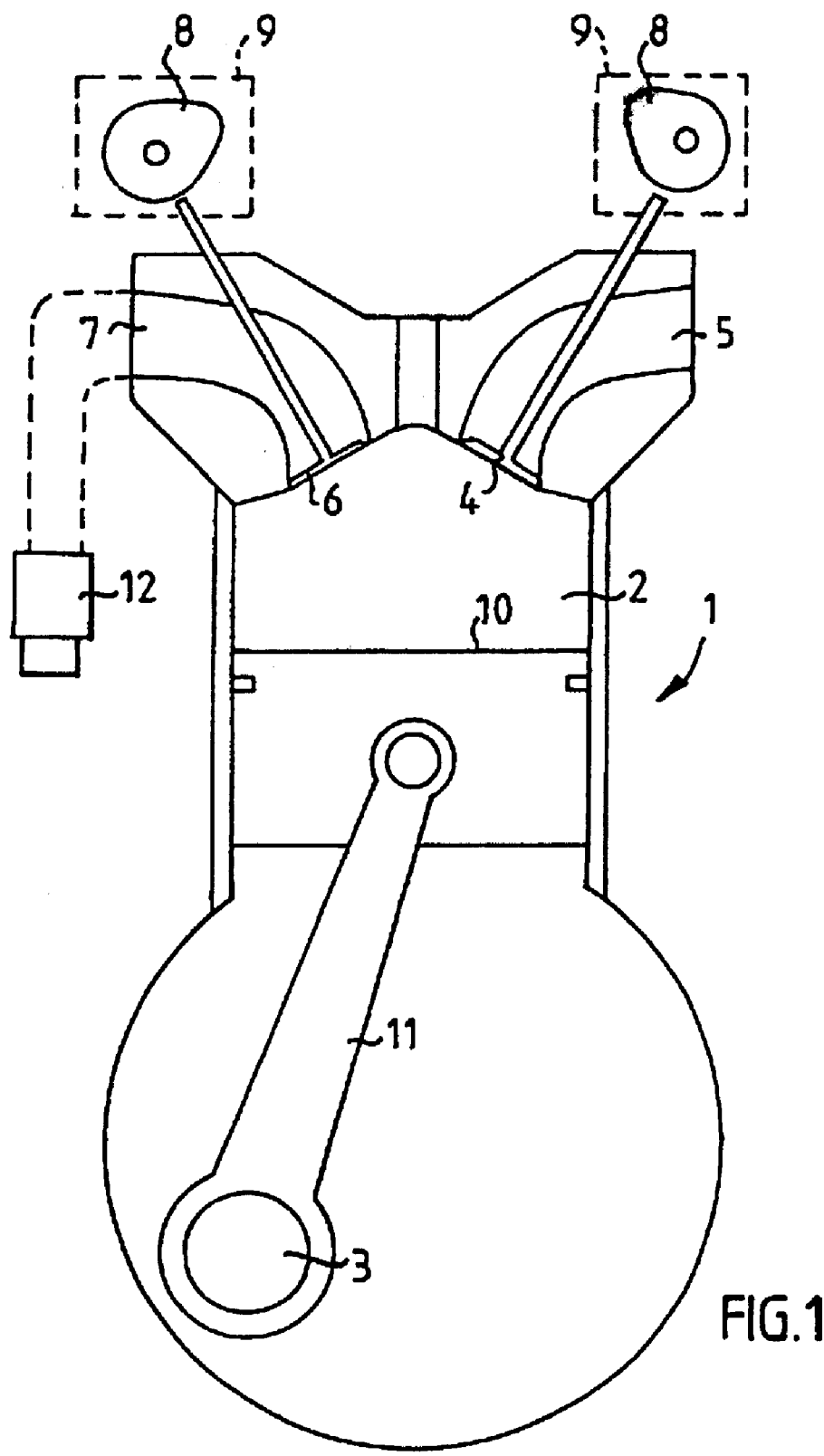
FIG. 1 illustrates a cross sectional view of an internal combustion engine.

FIG. 1 shows an internal combustion engine 1 having at least one cylinder 2 supplied with an air/fuel mixture when a crankshaft 3 of the internal combustion engine 1 rotates. At least one intake valve 4 opens and closes intake ducts 5 connected to the cylinder 2. The air/fuel mixture is supplied to the cylinder 2 through these ducts 5 when the engine 1 is working.

At least one exhaust valve 6 opens and closes exhaust ducts 7 connected to the cylinder 2. Burnt fuel in the form of exhaust gases is removed through the ducts 7 when the engine 1 is working.

The internal combustion engine 1 also includes control members 8 for controlling the opening and closing of the intake and exhaust valves 4, 6. In the embodiment illustrated in FIG. 1, the control members 8 consist of camshafts that can be adjusted so that the opening and closing time of the intake and exhaust valves 4, 6 can be varied. As an example, this can occur by a regulating arrangement 9, schematically shown in FIG. 1, that rotates the camshafts hydraulically in a manner known per se. Other control members 8 are also possible, such as electromagnetically controlled valves.

A piston 10 is mounted on the crankshaft 3 by means of a connecting rod 11. The piston 10 reciprocates between a top and a bottom dead-center position in the cylinder 2. The internal combustion engine 1 is preferably of the four-cylinder four-stroke type.

Figure 2:
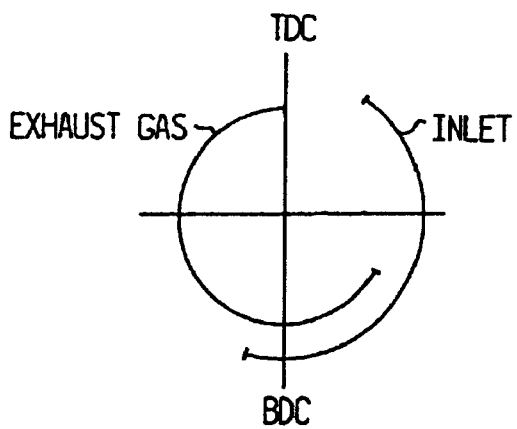
FIG. 2 is a graph of the opening and closing times of both intake and exhaust valves.

An exemplary embodiment of the method according to the present invention is shown in FIG. 2. FIG. 2 graphically illustrates the opening and closing times of both the intake and exhaust valves 4, 6. During the intake stroke, an air/fuel mixture having a lambda value greater than 1 is supplied to the cylinder 2. The lambda value lies substantially in the range of about 1.1 to about 1.4, and preferably in the range of about 1.1 to about 1.2. The CO, HC and $NO_x$ content in the exhaust gases depends on, inter alia, the mixing ratio of the air/fuel mixture supplied to the cylinder 2. This mixing ratio is typically indicated by a lambda value. The lambda value, or excess air factor, is the actual air quantity supplied divided by the air quantity theoretically necessary. If the lambda value is greater than one, the air/fuel mixture is lean. If the lambda value is less than one, the air/fuel mixture is rich. It is desirable to supply a lean air/fuel mixture when the internal combustion engine is cold so that the CO, HC and $NO_x$ content in the exhaust gas emitted from the internal combustion engine 1 is low.

The intake valve 4 is controlled to open after the piston 10 has passed the top dead-center position in order to prevent the operation of the internal combustion engine 1 from becoming uneven when a lean air/fuel mixture is supplied. By controlling the intake valve 4 so that it opens during the intake stroke at a crankshaft angle of about 20° to about 100° after the top dead-center position, a negative pressure is induced in the cylinder 2. Preferably, the intake valve opens during intake at a crankshaft angle of about 30° after the top dead-center position.

A prerequisite for forming negative pressure in the cylinder 2 is controlling the exhaust valve 6 so that it closes before the intake valve 4 opens. The exhaust valve 6 is preferably controlled so that it closes when the piston 10 is at top dead center. Both the exhaust valve 6 and the intake valve 4 are thus closed at the same time as the piston 10 moves downwards in the direction of the bottom dead-center position. This results in a negative pressure forming in the cylinder 2.

It is possible to close the exhaust valve 6 after the piston 10 has passed the top dead-center position, with the intake valve 4 controlled so that it opens after the piston 10 has passed the top dead-center position. Once the intake valve 4 is opened, the air/fuel mixture flows into the cylinder 2 at a greater flow rate due to the negative pressure in the cylinder 2. This increased flow rate contributes to a desirable swirling or mixing of the air/fuel mixture.

By opening the intake valve 4 after the piston has passed the top dead-center position, exhaust gases are prevented from flowing into the intake duct 5. If exhaust gases were to flow into the intake duct 5, it would affect the vaporization of fuel condensed in the walls of the duct 5, leading to a change in torque of the crankshaft 3 of the internal combustion engine 1 and, thus, uneven operation of the internal combustion engine 1. In this regard, the crankshaft angle refers to the angle through which the crankshaft 3 has rotated since the piston 10 was located in the top dead-center position. Accordingly, when the piston 10 is located in the top dead-center position, the crankshaft angle is zero. The intake valve 4 can further be controlled so that it closes after the piston 10 has reached the bottom dead-center position.

Ignition of the air/fuel mixture supplied to the cylinder 2 is carried out at a crankshaft angle of about 10° before to about 30° after the top dead-center position. Preferably, the air/fuel mixture ignition occurs at a crankshaft angle of about 0° to about 10° after the top dead-center position.

When a cold internal combustion engine 1 is started, the catalytic converter 12 in the internal combustion engine 1 is also cold. As mentioned previously, the catalytic converter 12 has to reach a certain working temperature in order for the catalytic converter 12 to effectively reduce toxic exhaust gas emissions from the internal combustion engine 1. According to the method of the present invention, by controlling the exhaust valve 6 so that it opens before the piston 10 has passed the bottom dead-center position during the expansion stroke, expansion is interrupted, allowing very hot exhaust gases to flow through the exhaust duct 7 and on to the catalytic converter 12. By doing so, the hot exhaust gases rapidly heat the catalytic converter 12 to its desired working temperature. It has been found that by controlling the exhaust valve 6 so that it opens at a crankshaft angle of about 90° to about 130° after the top dead-center position, the working temperature of the catalytic converter 12 is be reached very rapidly. Preferably, the exhaust valve 6 is controlled so that it opens at a crankshaft angle of about 100° after the top dead-center position. As such, the opening time of the exhaust valve 6 is relatively long.

Figure 3:
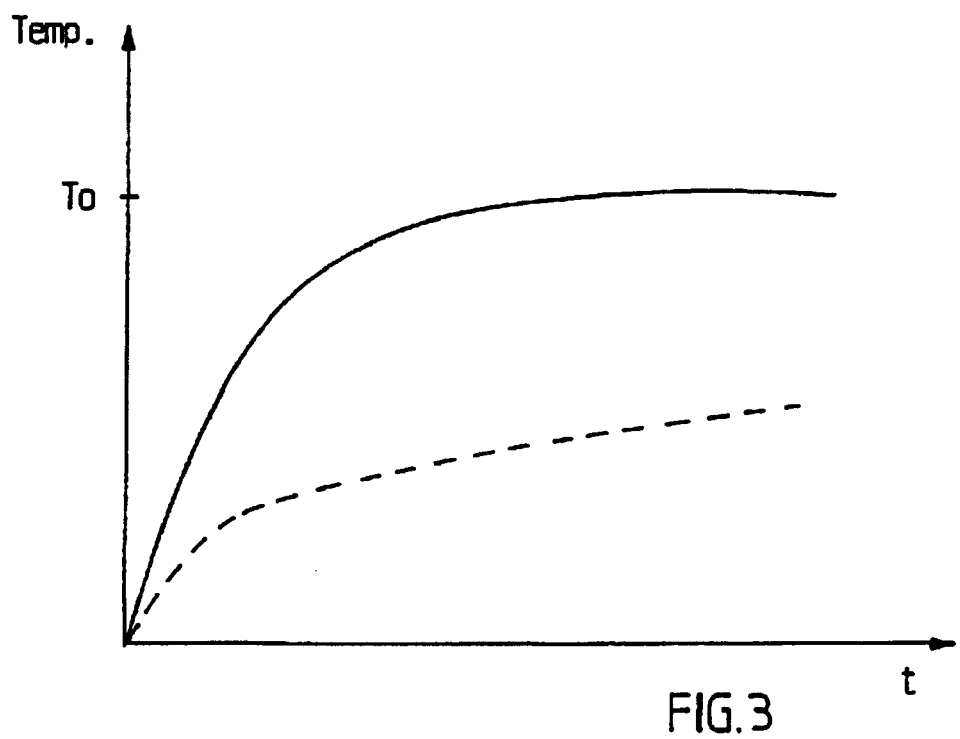
FIG. 3 is a graph of the heating time of the catalytic converter for both a conventionally controlled internal combustion engine and an internal combustion engine controlled according to the method according to the present invention.

FIG. 3 graphically illustrates the heating time of the catalytic converter 12 for a conventionally controlled internal combustion engine and an internal combustion engine 1 controlled according to the method of the present invention. The solid curve in FIG. 3 refers to the heating time of the catalytic converter 12 for an internal combustion engine 1 controlled according to the method of the present invention, whereas the broken line refers to the catalytic converter heating time for a conventionally controlled internal combustion engine. As can be seen from FIG. 3, the catalytic converter 12 of the internal combustion engine 1 controlled according to the method of the present invention reaches the working temperature more rapidly than the catalytic converter of the engine controlled conventionally.

In other embodiments, the internal combustion engine 1 can be supercharged by means of an exhaust turbo or mechanical compressor (not shown). In a supercharged internal combustion engine 1, energy is supplied from the compressor or the turbo so that, after expansion occurs in the cylinder, the combustion temperature increases further. In this manner, the catalytic converter can be heated more rapidly.

Preferably, the method according to the invention is used when the temperature of the catalytic converter 12 is lower than its working temperature. A sensor (not shown) can be arranged on the catalytic converter 12 for determining the temperature of the catalytic converter 12. Alternatively, the temperature of the engine 1 can be measured, from which an estimation of the temperature of the catalytic converter 12 determined.

When the working temperature of the catalytic converter 12 has been reached, the intake and exhaust valves 4, 6 and the ignition are controlled so that the engine 1 works optimally based on the prevailing operating conditions.

While there has been disclosed effective and efficient embodiments of the invention using specific terms, it should be well understood that the invention is not limited to such embodiments as there might be changes made in the arrangement, disposition, and form of the parts without departing from the principle of the present invention as comprehended within the scope of the accompanying claims.

What is claimed is:

1. A method of reducing exhaust gas emissions of an internal combustion engine, the engine having at least one cylinder supplied with an air/fuel mixture when a crankshaft of the internal combustion engine rotates, at least one intake valve, at least one exhaust valve, control members for controlling the opening and closing of the intake and exhaust valves, and a piston reciprocating between a top dead-center position and a bottom dead-center position in the cylinder, the method of reducing exhaust gas emissions comprising the steps of:

controlling the exhaust valve so that it opens before the piston has passed the bottom dead-center position and closes before the intake valve opens, supplying an air/fuel mixture with a lambda value greater than 1 to the cylinder, and controlling the intake valve so that it opens during the intake stroke after the piston has X passed the top dead-center position.

2. The method according to claim 1, further comprising the step of opening the exhaust valve at a crankshaft angle of about 90° to about 130° after the top dead-center position.

3. The method according to claim 2, further comprising the step of opening the exhaust valve at a crankshaft angle of about 100° after the top dead-center position.

4. The method according to claim 1, further comprising the step of closing the exhaust valve when the piston is located in the top dead-center position.

5. The method according to claim 1, further comprising the step of controlling the intake valve so that it opens at a crankshaft angle of about 20° to about 100° after the top dead-center position.

6. The method according to claim 5, further comprising the step of controlling the intake valve so that it opens at a crankshaft angle of about 30° after the top dead-center position.

7. The method according to claim 1, further comprising the step of igniting the air/fuel mixture supplied to the cylinder at a crankshaft angle of about 10° before to about 20° after the top dead-center position.

8. The method according to claim 7, further comprising the step of igniting the air/fuel mixture supplied to the cylinder at a crankshaft angle of about 0° to about 10° after the dead-center position.

9. The method according to claim 1, wherein the lambda value of the air/fuel mixture supplied to the cylinder lies substantially within the range of about 1.1 to about 1.4.

10. The method according to claim 9, wherein the lambda value of the air/fuel mixture supplied to the cylinder lies substantially within the range of about 1.1 to about 1.2.

11. The method according to claim 1, further comprising the step of using the method when cold-starting the internal combustion engine.

12. The method according to claim 1, wherein the control members for controlling the opening and closing of the intake and exhaust valves are adjustable so as to vary the opening and closing time of the intake and exhaust valves.

* * * * *